Patented Jan. 15, 1946

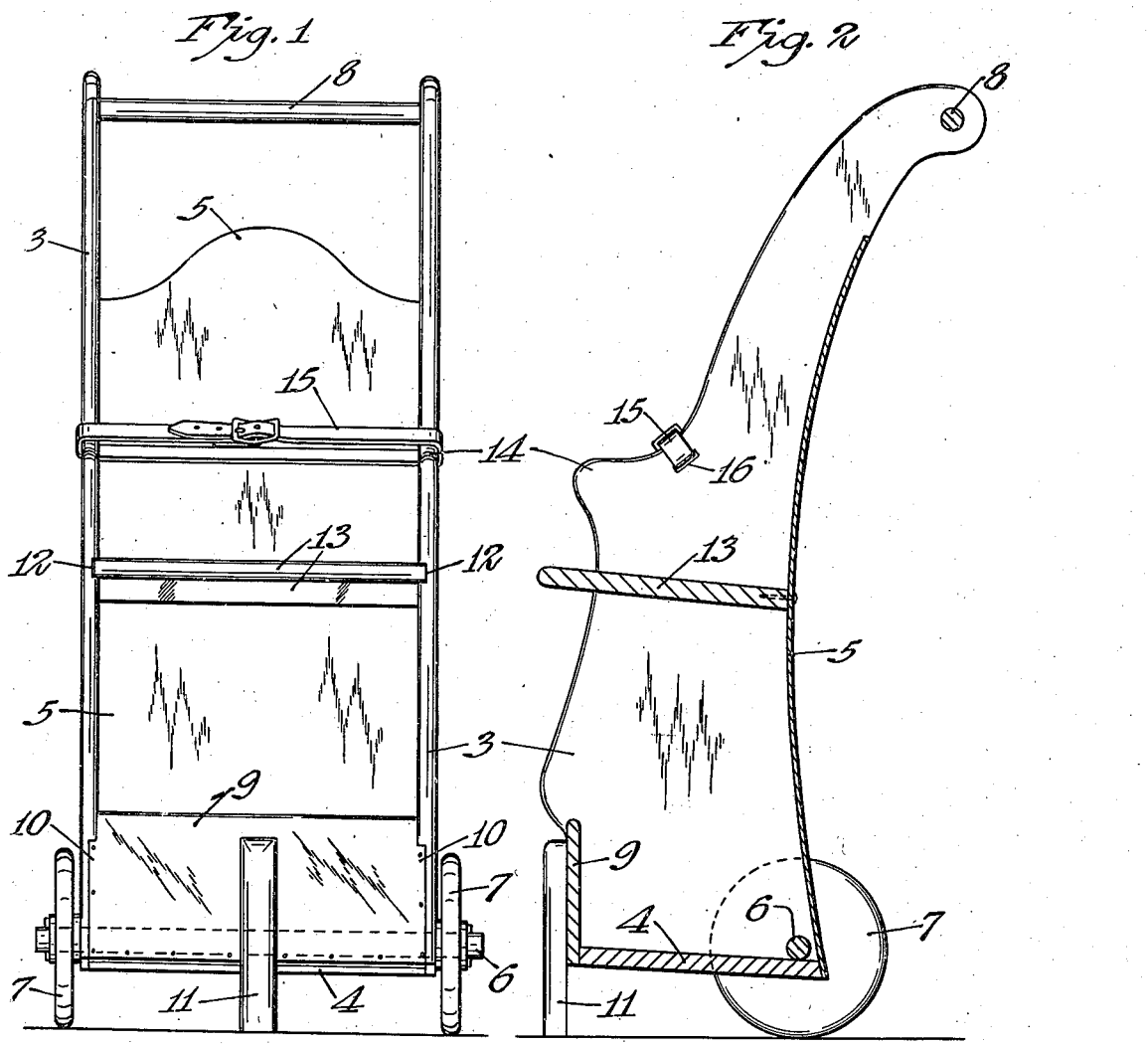

2,393,020

UNITED STATES PATENT OFFICE 2,393,020

SHOPPING CART

William S. Brede, Minneapolis, Minn.

Application August 14, 1943, Serial No. 498,670

3 Claims. (Cl. 280—51)

This invention relates to wheeled vehicles.

It is a general object of my invention to provide a relatively light compact structure having a pair of weight supporting wheels and having an upper handle by means of which the device can be pushed in the manner of a barrow, the structure including means for transporting a small child and additional means therebeneath for receiving and transporting packages. With such a device a shopper can conveniently transport her child and a number of packages with a single light-weight and easily maneuvered vehicle.

The above and other objects and advantages of the invention will more fully appear from the following description made in connection with the accompanying drawing, wherein like reference characters refer to the same parts throughout the views, and, in which:

Fig. 1 is a front elevation of the device; and

Fig. 2 is a longitudinal vertical section therethrough.

The body of the vehicle includes a pair of sides 3, a bottom 4 and a back 5. The sides, bottom and back are all suitably secured together to provide a relatively rigid body portion. Extending between the sides 3 and outwardly therefrom is an axle 6 which is positioned at the lower rear corners of said sides 3 immediately above the bottom 4 and in front of the back 5. It will be noted in Fig. 2 that the lower rear portion of each side 3 flares rearwardly thus placing the wheels 7 on the axle 6 a considerable distance to the rear of the vehicle body.

The sides 3 extend upwardly and rearwardly as shown in Fig. 2 and their upper ends are connected by a handle bar 8 which can be grasped so that the vehicle can be tilted rearwardly at its upper portion about the axes of the wheels 7 to permit the vehicle to be pushed forwardly on said wheels 7.

A lower front wall portion 9 is secured at its lower edge to the forward edge of the bottom 4 and the ends of said front wall 9 are rabbeted into the lower front portions of the sides 3 as indicated at 10 in Fig. 1. Secured to the lower front wall 9 is a centrally disposed and downwardly extending front support 11 which permits the device to be rested in a generally upright position as indicated in the drawing.

Fitted into opposed grooves 12 formed in the inner walls of the sides 3 is a seat member 13 which slants backwardly and downwardly slightly, as best shown in Fig. 2. Just above the seat 13 the side walls 3 are provided with extensions 14 which provide arm rests functioning in conjunction with said seat 13. A suitable restraining device such as the strap 15 extends between slots 16 formed in the side walls 3.

With a vehicle such as shown and described a housewife can go shopping with her child seated on the seat 13 and held by the restrainer or safety strap 15. When she does her shopping she can place her parcels in the receptacle formed by the lower portions of the sides 3, the back 5, bottom 4 and lower front wall 9. The spacing of the seat 13 above the front wall 9 is such that the parcel compartment is easily accessible and the location of the compartment at the bottom of the device increases its stability when it is positioned upright as shown in the drawing. Furthermore, the rearward flaring of the sides 3 permits the wheels 7 to be placed a considerable distance rearwardly relative to the seat 13 so that there is no likelihood of the device tipping over due to movement on the part of the child on the seat. It should also be noted that the upper portions of the sides 3 slant rearwardly, not only giving the vehicle a graceful appearance but making the handle conveniently accessible to the person propelling the device.

It will, of course, be understood that various changes may be made in the form, details, arrangement and proportions of the various parts throughout the views without departing from the scope of my invention.

What I claim is:

1. A wheeled vehicle comprising, an upstanding body including sides, a back, a bottom and a pair of wheels at its lower rear portion, said body being tiltable rearwardly about the axes of said wheels, a lower front wall extending between said sides and forming a compartment with said sides, back, and bottom, and a seat extending between said sides in upwardly spaced relation to said lower front wall to afford access to said compartment.

2. A wheeled vehicle comprising, an upstanding body including sides, a back, a bottom and a pair of wheels at its lower rear portion, said body being tiltable rearwardly about the axes of said wheels, a lower front wall extending between said sides and forming a compartment with said sides, back and bottom, a seat extending between said sides in upwardly spaced relation to said lower front wall to afford access to said compartment, said sides extending upwardly above said seat, and a horizontal handle connecting the upper portions of said sides.

3. A wheeled vehicle comprising, an upstanding body including sides, a back, a bottom and a pair of wheels at its lower rear portion, said body being tiltable rearwardly about the axes of said wheels, a seat extending between said sides and rearwardly to said back, and a lower front wall extending upwardly from said bottom and between said sides and terminating a substantial distance below said seat, said sides, back, bottom, seat and front wall defining a compartment with the space between said front wall and said seat defining a compartment opening, and said compartment opening being disposed in an angularly upward relationship when said vehicle is tilted rearwardly about said axes of said wheels.

WILLIAM S. BREDE.